United States Patent
Ito et al.

(10) Patent No.: US 11,368,177 B2
(45) Date of Patent: Jun. 21, 2022

(54) RADIO FREQUENCY MODULE AND COMMUNICATION DEVICE

(71) Applicant: Murata Manufacturing Co., Ltd., Nagaokakyo (JP)

(72) Inventors: Takanori Ito, Nagaokakyo (JP); Morio Takeuchi, Nagaokakyo (JP); Yukiya Yamaguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 16 days.

(21) Appl. No.: 17/128,216

(22) Filed: Dec. 21, 2020

(65) Prior Publication Data

US 2021/0194518 A1    Jun. 24, 2021

(30) Foreign Application Priority Data

Dec. 23, 2019   (JP) .............................. JP2019-231766

(51) Int. Cl.
*H04B 1/38* (2015.01)
*H04L 5/16* (2006.01)
(Continued)

(52) U.S. Cl.
CPC ............... *H04B 1/04* (2013.01); *H04B 1/005* (2013.01); *H04B 1/1009* (2013.01); *H04B 1/1018* (2013.01); *H04B 2001/0408* (2013.01)

(58) Field of Classification Search
CPC ........ H04B 1/04; H04B 1/005; H04B 1/1009; H04B 1/1018; H04B 2001/0408;
(Continued)

(56) References Cited

U.S. PATENT DOCUMENTS 7,848,714 B2 * 12/2010 Takeda ................. H03F 1/0277
  375/295
8,130,787 B2 *  3/2012 Hagiwara ............ H04B 7/0842
  370/463

(Continued)

FOREIGN PATENT DOCUMENTS

JP    2019-176452 A    10/2019
JP    2019-212870 A    12/2019
(Continued)

OTHER PUBLICATIONS

Office Action dated Jan. 19, 2022, in corresponding Korean patent Application No. 10-2020-0177076, 11 pages.

*Primary Examiner* — Phuong Phu
(74) *Attorney, Agent, or Firm* — Xsensus LLP (57) ABSTRACT

In a radio frequency module, the first inductor is disposed on the first principal surface of the mounting board and located on the first reception path through which a first reception signal of a first frequency passes, on an input side of the first low noise amplifier. The second inductor is disposed on the first principal surface of the mounting board and located on the second reception path through which a second reception signal of a second frequency lower than the first frequency passes, on an input side of the second low noise amplifier. The radio frequency component is disposed between the first inductor and the second inductor. A distance between the first inductor and the shielding layer is greater than a distance between the second inductor and the shielding layer. The first inductor overlaps the first low noise amplifier in a thickness direction of the mounting board.

20 Claims, 5 Drawing Sheets (51) Int. Cl.
*H04B 1/04* (2006.01)
*H04B 1/00* (2006.01)
*H04B 1/10* (2006.01)

(58) Field of Classification Search
CPC . H04B 1/48; H04B 1/401; H04B 7/04; H04B 7/0842; H01L 25/18; H01L 21/565; H01L 23/49811; H03H 7/38; H03F 3/195; H03F 1/0277; H05K 3/4644; H05K 1/186
USPC .................. 375/219, 220, 295, 316, 346
See application file for complete search history.

(56) References Cited

U.S. PATENT DOCUMENTS

| | | | |
|---|---|---|---|
| 8,803,632 B2* | 8/2014 | Takeuchi | H03H 7/38 333/101 |
| 2009/0011726 A1* | 1/2009 | Nishimura | H05K 1/186 455/120 |
| 2011/0037170 A1* | 2/2011 | Shinohara | H01L 21/565 257/737 |
| 2014/0185256 A1* | 7/2014 | Ogawa | H05K 3/4644 29/841 |
| 2015/0179621 A1* | 6/2015 | Matsumoto | H01L 23/49811 257/737 |
| 2015/0318889 A1* | 11/2015 | Lee | H04B 7/04 455/78 |
| 2017/0077982 A1* | 3/2017 | Obkircher | H04B 1/401 |
| 2017/0214371 A1* | 7/2017 | Noori | H03F 3/195 |
| 2017/0317710 A1* | 11/2017 | Liu | H04B 1/48 |
| 2018/0083665 A1* | 3/2018 | Sugawara | H03H 7/38 |
| 2018/0342472 A1* | 11/2018 | Dogiamis | H01L 25/18 |
| 2019/0378802 A1 | 12/2019 | Ito | |
| 2020/0007096 A1 | 1/2020 | Kita | |

FOREIGN PATENT DOCUMENTS

| | | |
|---|---|---|
| WO | 2018/110393 A1 | 6/2018 |
| WO | 2018/168500 A1 | 9/2018 |

* cited by examiner

RADIO FREQUENCY MODULE AND COMMUNICATION DEVICE

CROSS REFERENCE TO RELATED APPLICATION

The present application is based on and claims priority to Japanese Patent Application No. 2019-231766 filed on Dec. 23, 2019. The entire disclosure of the above-identified application, including the specification, drawings and claims is incorporated herein by reference in its entirety.

TECHNICAL FIELD

The present disclosure relates generally to radio frequency modules and communication devices, and more specifically to a radio frequency module including a plurality of low noise amplifiers and a communication device including the radio frequency module.

BACKGROUND

International Publication No. 2018/110393 discloses a front-end module (radio frequency module) including a plurality of amplifier circuits (low noise amplifiers).

SUMMARY

Technical Problems

However, as recognized by the present inventor, when a shielding layer is provided so as to cover a plurality of components disposed on a mounting board in a conventional radio frequency module, Q-value of an inductor deteriorates in a high-frequency band as a result of the inductor being close to the shielding layer. In addition, the length of a line between the inductor and a low noise amplifier increases in a high-frequency band. For that reason, there arises a problem that noise figure (NF) increases.

The present disclosure has been conceived in view of the above. The present disclosure is presented to provide a radio frequency module and a communication device that are capable of the improving noise figure (NF).
Solutions A radio frequency module according to one aspect of the present disclosure includes: a mounting board; a first low noise amplifier; a second low noise amplifier; a first inductor; a second inductor; at least one radio frequency component; and a shielding layer. The mounting board includes a first principal surface and a second principal surface on opposite sides of the mounting board. The external-connection terminal is disposed on the second principal surface of the mounting board. The first low noise amplifier is disposed on the second principal surface of the mounting board and located on a first reception path through which a first reception signal of a first frequency passes. The second low noise amplifier is disposed on the second principal surface of the mounting board and located on a second reception path through which a second reception signal of a second frequency passes, the second frequency being lower than the first frequency. The first inductor is disposed on the first principal surface of the mounting board and located on the first reception path on an input side of the first low noise amplifier. The second inductor is disposed on the first principal surface of the mounting board and located on the second reception path on an input side of the second low noise amplifier. The at least one radio frequency component is disposed on the first principal surface of the mounting board between the first inductor and the second inductor. The shielding layer is configured to cover the first low noise amplifier, the second low noise amplifier, the first inductor, the second inductor, and the at least one radio frequency component. In the radio frequency module, a distance between the first inductor and the shielding layer is greater than a distance between the second inductor and the shielding layer in a direction in which the first inductor, the at least one radio frequency component, and the second inductor are aligned, and the first inductor overlaps the first low noise amplifier in a thickness direction of the mounting board.

A communication device according to one aspect of the present disclosure includes: the radio frequency module; and a signal processing circuit. The signal processing circuit is configured to process a signal from the radio frequency module.

Advantageous Effects

With the radio frequency module and the communication device according to the above-described aspects of the present disclosure, it is possible to improve noise figure (NF).

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, a radio frequency module and a communication device according to Embodiments 1 to 4 will be described with reference to the drawings. FIG. 1, FIG. 2, and FIG. 4 to FIG. 7 which will be referred to in the following embodiments and the like are each schematic diagrams, and the size ratio and the thickness ratio between the structural components illustrated in the diagrams do not necessarily reflect actual dimensional ratios.

Embodiment 1

1. Radio Frequency Module

A configuration of radio frequency module 1 according to Embodiment 1 will be described with reference to the drawings.

Figure 1:
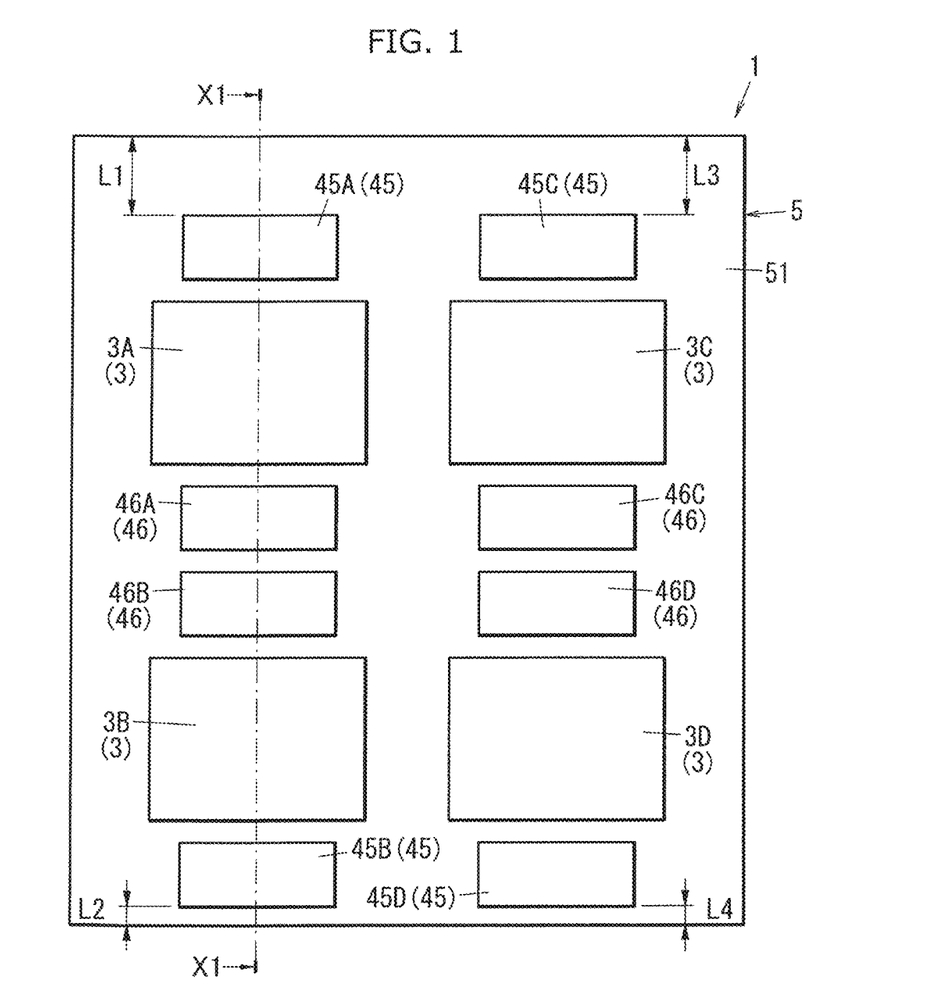
FIG. 1 illustrates a plan view of a radio frequency module according to Embodiment 1.
Figure 2:
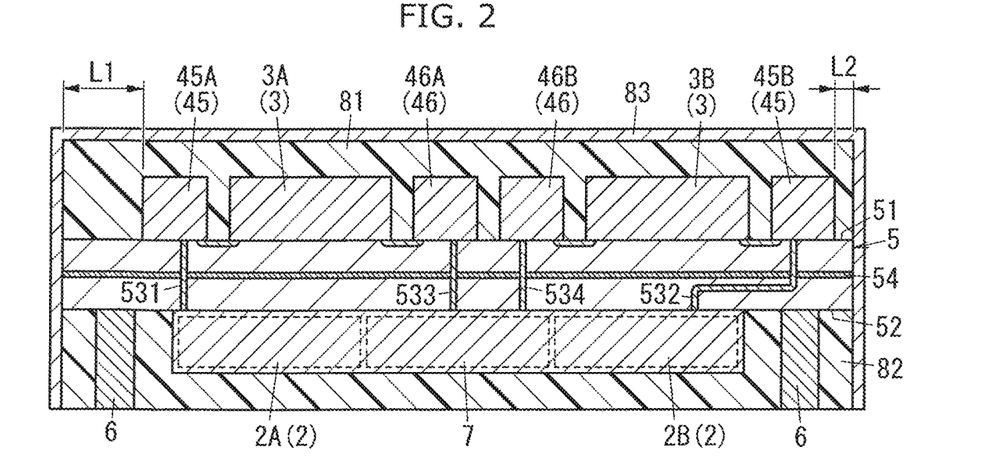
FIG. 2 illustrates a cross-sectional view of the radio frequency module according to Embodiment 1 taken along line X1-X1 of FIG. 1.
Figure 3:
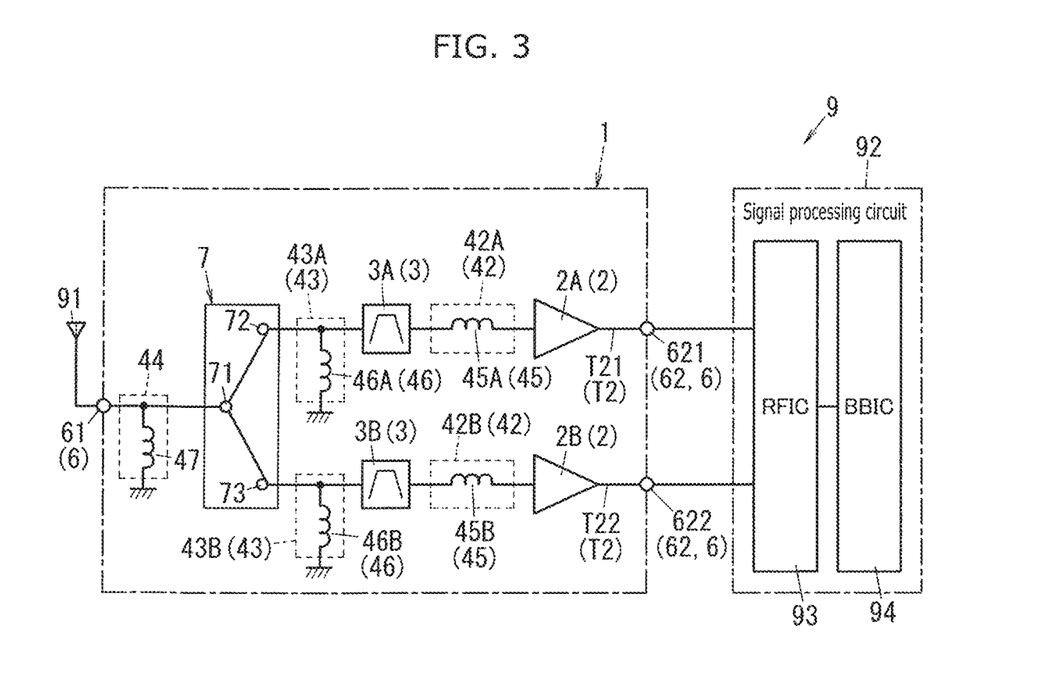
FIG. 3 is a schematic diagram illustrating a communication device according to Embodiment 1.

As illustrated in FIG. 3, radio frequency module 1 according to Embodiment 1 includes: a plurality of low noise amplifiers 2 (two low noise amplifiers 2 in the example as illustrated) and a plurality of reception filters 3 (two reception filters 3 in the example as illustrated). In addition, radio frequency module 1 includes: a plurality of matching circuits 42 (two matching circuits 42 in the example as illustrated); a plurality of matching circuits 43 (two matching circuits 43 in the example as illustrated); matching circuit 44; a plurality of external-connection terminals 6; and switch 7. In addition, radio frequency module 1 includes: mounting board 5; first resin component 81; second resin component 82; and shielding layer 83 as illustrated in FIG. 1 and FIG. 2.

Radio frequency module 1 is used, for example, in communication device 9 as illustrated in FIG. 3. Communication device 9 is, for example, a mobile phone such as a smartphone. It should be noted that communication device 9 is not limited to a mobile phone. Communication device 9 may be a wearable terminal or the like such as a smartwatch.

Radio frequency module 1 is, for example, a module compatible with the fourth generation mobile communication (4G) standard, the fifth generation mobile communication (5G) standard, etc. 4G standard is, for example, 3GPP long term evolution (LTE) standard. 5G standard is, for example, 5G new radio (NR). Radio frequency module 1 is a module compatible with carrier aggregation and dual connectivity.

Radio frequency module 1 performs communication using a plurality of communication bands. More specifically, radio frequency module 1 receives a reception signal of each of the plurality of communication bands. Radio frequency module 1, in particular, performs communication of a first communication band and communication of a second communication band. To be more specific, radio frequency module 1 receives a reception signal of the first communication band and a reception signal of the second communication band.

Radio frequency module 1 includes a plurality of reception paths T2 (two reception paths T2 in the example as illustrated) in order to receive reception signals of the plurality of communication bands. The plurality of reception paths T2 include first reception path T21 and second reception path T22. A first reception signal of the first communication band (a first frequency) passes through first reception path T21, and a second reception signal of the second communication band (a second frequency) passes through second reception path T22. The second communication band (the second frequency) is lower than the first communication band (the first frequency).

In radio frequency module 1, first reception path T21 and second reception path T22 are paths that are simultaneously used. In other words, in radio frequency module 1, first reception path T21 and second reception path T22 are modules that are compatible with carrier aggregation and dual connectivity.

The reception signal is, for example, a signal of frequency division duplex (FDD). The FDD is a wireless communication technique for performing transmission and reception by allocating different frequency bands to transmission and reception in wireless communications. It should be noted that the reception signal is not limited to a signal of the FDD. The reception signal may be a signal of time division duplex (TDD). The TDD is a wireless communication technique for performing communications by switching between transmission and reception at each predetermined time, by allocating the same frequency band to transmission and reception in wireless communications.

2. Circuit Configuration of Radio Frequency Module

A circuit configuration of radio frequency module 1 according to Embodiment 1 will be described with reference to the drawings. Here, the case where a reception signal is a signal of the FDD will be described.

2.1. Low Noise Amplifier

Each of the plurality of low noise amplifiers 2 illustrated in FIG. 3 is an amplifier that amplifies the amplitude of a reception signal with low noise. The plurality of low noise amplifiers 2 are disposed between matching circuits 42 and output terminals 62 on reception paths T2 that connect antenna terminal 61 that will be described later and output terminals 62. The plurality of low noise amplifiers 2 are respectively connected to an external circuit (for example, signal processing circuit 92) via output terminals 62.

The plurality of low noise amplifiers 2 include first low noise amplifier 2A and second low noise amplifier 2B. First low noise amplifier 2A is disposed on first reception path T21, and second low noise amplifier 2B is disposed on second reception path T22.

2.2. Reception Filter

Each of the plurality of reception filters 3 illustrated in FIG. 3 is a reception filter of a communication band that passes a reception signal. The plurality of reception filters 3 are disposed between antenna terminal 61 and matching circuits 42 on reception paths T2 that connect antenna terminal 61 and output terminals 62. The plurality of reception filters 3 are respectively connected to low noise amplifiers 2 via reception paths T2. Each of the plurality of reception filters 3 passes a reception signal of the reception band of the above-described communication band among radio frequency signals that have been input through antenna terminal 61.

The plurality of reception filters 3 include first reception filter 3A, first reception filter 3C (see FIG. 1), second reception filter 3B, and second reception filter 3D (see FIG. 1). First reception filter 3A is disposed on first reception path T21, and second reception filter 3B is disposed on second reception path T22.

2.3. Matching Circuit

The plurality of matching circuits 42 are disposed between reception filters 3 and low noise amplifiers 2 on reception paths T2, as illustrated in FIG. 3. Matching circuits 42 are circuits for matching impedance between reception filters 3 and low noise amplifiers 2.

The plurality of matching circuits 42 include first matching circuit 42A, second matching circuit 42B, third matching circuit (not illustrated), and fourth matching circuit (not illustrated). First matching circuit 42A is disposed on first reception path T21, and second matching circuit 42B is disposed on second reception path T22.

Each of matching circuits 42 includes inductor 45. First matching circuit 42A includes first inductor 45A. First inductor 45A is disposed on the input side of first low noise amplifier 2A on first reception path T21. Second matching circuit 42B includes second inductor 45B. Second inductor 45B is disposed on the input side of second low noise amplifier 2B on second reception path T22. The third matching circuit includes first inductor 45C (see FIG. 1). First inductor 45C is disposed on the input side of first low noise amplifier 2A. The fourth matching circuit includes second inductor 45D (see FIG. 1). Second inductor 45D is disposed on the input side of second low noise amplifier 2B. It should be noted that the configuration of each of matching circuits 42 is not limited to the configuration that includes a single inductor 45. For example, each of matching circuits 42 may include a plurality of inductors that includes inductor 45, or may include a plurality of inductors that includes inductor 45 and a plurality of capacitors. In other words, each of matching circuits 42 includes at least one inductor 45.

The plurality of matching circuits 43 are disposed between switch 7 and reception filters 3 on reception paths T2, as illustrated in FIG. 3.

The plurality of matching circuits 43 include first matching circuit 43A, second matching circuit 43B, third matching circuit (not illustrated), and fourth matching circuit (not illustrated). First matching circuit 43A is disposed on first reception path T21, and second matching circuit 43B is disposed on second reception path T22.

Each of matching circuits 43 includes inductor 46. First matching circuit 43A includes inductor 46A. Inductor 46A is disposed between switch 7 and first reception filter 3A on first reception path T21. Second matching circuit 43B includes inductor 46B. Inductor 46B is disposed between switch 7 and second reception filter 3B on second reception path T22. The third matching circuit includes first inductor 46C (see FIG. 1). Inductor 46C is disposed between switch 7 and first reception filter 3C (see FIG. 1). The fourth matching circuit includes inductor 46D. Inductor 46D is disposed between switch 7 and second reception filter 3D (see FIG. 1). Inductor 46 of each of matching circuits 43 is, for example, disposed between the node and the ground on reception path T2. It should be noted that the configuration of each of matching circuits 43 is not limited to the configuration that includes a single inductor 46. For example, each of matching circuits 43 may include a plurality of inductors that include inductor 46, or may include a plurality of inductors that include inductor 46 and a plurality of capacitors. In other words, each of matching circuits 43 includes at least one inductor 46.

Matching circuit 44 is disposed between antenna terminal 61 and switch 7 as illustrated in FIG. 3. Matching circuit 44, for example, includes a single inductor 47.

Inductor 47 is, for example, disposed between the node and the ground on the path between antenna terminal 61 and switch 7. It should be noted that the configuration of matching circuit 44 is not limited to the configuration that includes a single inductor 47. For example, matching circuit 44 may include a plurality of inductors, or may include a plurality of inductors and a plurality of capacitors.

2.4. Switch

Switch 7 is, as illustrated in FIG. 3, a switch that switches between the paths (reception paths T2) to be connected to antenna 91 that will be described later. Switch 7 includes common terminal 71 and two selection terminals 72 and 73. Common terminal 71 is connected to antenna terminal 61 that will be described later. Selection terminal 72 is connected to first matching circuit 43A. Selection terminal 73 is connected to second matching circuit 43B.

Switch 7 is a switch capable of connecting two selection terminals 72 and 73 to common terminal 71. Switch 7 is a direct mapping switch capable of performing one-to-many connection. Switch 7 is capable of simultaneously performing connection of first reception path T21 to antenna terminal 61 and connection of second reception path T22 to antenna terminal 61. Switch 7 is, for example, controlled by signal processing circuit 92. More specifically, switch 7 switches the connection state of common terminal 71 between the two selection terminals 72 and 73, according to a control signal from RF signal processing circuit 93 of signal processing circuit 92.

2.5. External-Connection Terminal

The plurality of external-connection terminals 6 include antenna terminal 61 and a plurality of output terminals 62 (two output terminals 62 in the example as illustrated), as illustrated in FIG. 3. Antenna terminal 61 is connected to antenna 91 that will be described later. The plurality of output terminals 62 are connected to signal processing circuit 92 that will be described later. Each of the plurality of output terminals 62 is a terminal through which a radio frequency signal (reception signal) from low noise amplifier 2 is output to the external circuit (for example, signal processing circuit 92). The plurality of output terminals 62 include first output terminal 621 and second output terminal 622. First output terminal 621 is connected to the output side of first low noise amplifier 2A, and second output terminal 622 is connected to the output side of second low noise amplifier 2B.

3. Configuration of Radio Frequency Module

A configuration of radio frequency module 1 according to Embodiment 1 will be described with reference to the drawings.

Radio frequency module 1 includes mounting board 5 and a plurality of circuit elements, as illustrated in FIG. 1 and FIG. 2. Radio frequency module 1 includes, as the plurality of circuit elements: the plurality of low noise amplifiers 2 (two low noise amplifiers 2 in the example as illustrated); the plurality of reception filters 3 (four reception filters in the example as illustrated); the plurality of inductors 45 (four inductors 45 in the example as illustrated) which are included in the plurality of matching circuits 42; the plurality of inductors 46 (four inductors 46 in the example as illustrated) which are included in the plurality of matching circuits 43; and switch 7. In FIG. 2, among the plurality of circuit elements, first low noise amplifier 2A, second low noise amplifier 2B, and switch 7 are included in a single chip.

Radio frequency module 1 can be electrically connected to a motherboard (not illustrated). The motherboard corresponds to, for example, a motherboard of a mobile phone, a communication apparatus, or the like. It should be noted that, the state in which radio frequency module 1 can be electrically connected to the motherboard includes not only the state in which radio frequency module 1 is directly mounted on the motherboard, but also the state in which radio frequency module 1 is indirectly mounted on the motherboard. It should be noted that the state in which radio frequency module 1 indirectly mounted on the motherboard refers to, for example, the state in which radio frequency module 1 is mounted on another radio frequency module mounted on the motherboard.

3.1 Mounting Board

Mounting board 5 includes first principal surface 51 and second principal surface 52 as illustrated in FIG. 1 and FIG. 2. First principal surface 51 and second principal surface 52 are arranged on opposite sides in the thickness direction of mounting board 5. Second principal surface 52 faces a motherboard (not illustrated) when radio frequency module 1 is disposed on the motherboard.

Mounting board 5 is a multi-layer board including a plurality of dielectric layers. Mounting board 5 includes a plurality of conductor pattern members and a plurality of columnar electrodes. The plurality of conductor pattern members include a conductor pattern members that is set to a ground potential. In the example of FIG. 2, ground layer 54 corresponds to the conductor pattern members that is set to the ground potential. The plurality of columnar electrodes are used for electrically connecting the circuit elements mounted on first principal surface 51 to the conductor pattern members of mounting board 5. In addition, the plurality of columnar electrodes are used for electrically connecting the circuit elements mounted on first principal surface 51 and the conductor pattern members of mounting board 5 to external-connection terminals 6.

3.2 Reception Filter

The plurality of reception filters 3 are each, for example, an acoustic wave filter including a plurality of serial arm resonators and a plurality of parallel arm resonators. The acoustic wave filter is, for example, a surface acoustic wave (SAW) filter that uses surface acoustic waves. In addition, the plurality of reception filters 3 may each include at least one of an inductor or a capacitor that is connected in series or in parallel to any of the plurality of serial arm resonators, or may each include an inductor or a capacitor that is connected in series or in parallel to any of the plurality of parallel arm resonator.

3.3. Matching Circuit

The plurality of inductors 45 which are included in the plurality of matching circuits 42 are disposed on first principal surface 51 of mounting board 5, as illustrated in FIG. 1 and FIG. 2. As described above, first matching circuit 42A includes first inductor 45A, and second matching circuit 42B includes second inductor 45B. Inductor 45 is, for example, a chip element (i.e., a chip inductor) mounted on first principal surface 51 of mounting board 5, or a conductor pattern members (i.e., a line inductor) included in mounting board 5. In the example of FIG. 1, inductor 45 is mounted on first principal surface 51 of mounting board 5. In other words, inductor 45 is disposed on a first principal surface 51 side of mounting board 5 rather than a second principal surface 52 side of mounting board 5. When inductor 45 is a chip inductor, the outer periphery shape of inductor 45 is, for example, a quadrilateral shape in a plan view of mounting board 5 in the thickness direction.

3.4 Low Noise Amplifier

Each of the plurality of low noise amplifiers 2 are disposed on second principal surface 52 of mounting board 5, as illustrated in FIG. 2. More specifically, switch 7 (electronic element) different from first low noise amplifier 2A and second low noise amplifier 2B, first low noise amplifier 2A, and second low noise amplifier 2B are included in a single chip. First low noise amplifier 2A and second low noise amplifier 2B are disposed on second principal surface 52 of mounting board 5. It should be noted that a portion of low noise amplifier 2 may be mounted on second principal surface 52 of mounting board 5, and the remaining portion of low noise amplifier 2 may be disposed inside mounting board 5. In other words, low noise amplifier 2 is disposed on mounting board 5 to be close to second principal surface 52, and includes at least a portion that is mounted on second principal surface 52.

3.5 External-Connection Terminal

The plurality of external-connection terminals 6 illustrated in FIG. 1 and FIG. 2 are terminals for electrically connecting mounting board 5 and motherboard (not illustrated). The plurality of external-connection terminals 6 include antenna terminal 61 and the plurality of output terminals 62 (two output terminals 62 in the example as illustrated), as illustrated in FIG. 3.

The plurality of external-connection terminals 6 are disposed on second principal surface 52 of mounting board 5. Each of the plurality of external-connection terminals 6 is a penetrating electrode having a columnar shape. The material of the plurality of external-connection terminals 6 is, for example, metal (e.g., copper, a copper alloy, etc.).

In radio frequency module 1, more than one external-connection terminals 6 are disposed, from the perspective of mountability of radio frequency module 1 onto the motherboard, an increase in the number of the ground electrodes of radio frequency module 1, etc.

3.6 First Resin Component

As illustrated in FIG. 2, first resin component 81 is disposed on first principal surface 51 of mounting board 5, and covers first principal surface 51 and a plurality of circuit elements disposed on first principal surface 51. First resin component 81 has a function of ensuring reliability such as a mechanical strength (impact resistance) and moisture resistance of the circuit elements disposed on first principal surface 51. In other words, first resin component 81 has a function of protecting the circuit elements disposed on first principal surface 51. First resin component 81 may include a filler in addition to a resin.

3.7 Second Resin Component

As illustrated in FIG. 2, second resin component 82 is disposed on second principal surface 52 of mounting board 5, and covers second principal surface 52 and a plurality of circuit elements disposed on second principal surface 52. Second resin component 82 has a function of ensuring reliability such as a mechanical strength (impact resistance) and moisture resistance of the circuit elements disposed on second principal surface 52. In other words, second resin component 82 has a function of protecting the circuit elements disposed on second principal surface 52. Second resin component 82 may include a filler in addition to resin.

3.8 Shielding Layer

Shielding layer 83 covers first resin component 81 and mounting board 5 as illustrated in FIG. 2. In addition, shielding layer 83 covers first low noise amplifier 2A, second low noise amplifier 2B, first inductor 45A, second inductors 45B, 46A, and 46B, first reception filter 3A, and second reception filter 3B. Furthermore, shielding layer 83 covers first inductor 45C (see FIG. 1), second inductor 45D (see FIG. 1), inductors 46C and 46D, first reception filter 3C (see FIG. 1), second reception filter 3D (see FIG. 1), and switch 7.

The material of shielding layer 83 is metal, for example. Shielding layer 83 is in contact with ground layer 54 of mounting board 5. According to this configuration, it is possible to set the potential of shielding layer 83 to be the same as the potential of ground layer 54.

4. Arrangement Relation

Next, arrangement relations of the plurality of components of radio frequency module 1 according to Embodiment 1 will be described with reference to FIG. 1 and FIG. 2.

As described above, the plurality of reception filters 3, the plurality of inductors 45, and the plurality of inductors 46 are disposed on first principal surface 51 of mounting board 5. The chip including the plurality of low noise amplifiers 2 and switch 7 is disposed on second principal surface 52 of mounting board 5.

As illustrated in FIG. 1 and FIG. 2, first reception filter 3A and second reception filter 3B are disposed between first inductor 45A and second inductor 45B on first principal surface 51 of mounting board 5. The expression "first reception filter 3A and second reception filter 3B are disposed between first inductor 45A and second inductor 45B" means that first reception filter 3A and second reception filter 3B are disposed in a minimum region including a plurality of straight lines connecting given points of first inductor 45A and given points of second inductor 45B. In this case, it is sufficient if at least a portion of first reception filter 3A and at least a portion of second reception filter 3B are included in the above-described region.

According to the above-described arrangement state, in the direction in which first inductor 45A, a plurality of radio frequency components, and second inductor 45B are aligned, distance L1 between first inductor 45A and shielding layer 83 is greater than distance L2 between second inductor 45B and shielding layer 83. Here, the plurality of radio frequency components include first reception filter 3A, second reception filter 3B, and the plurality of inductors 46 (two inductors 46 in the example as illustrated).

In addition, in the direction in which first inductor 45C, a plurality of radio frequency components, and second inductor 45D are aligned, distance L3 between first inductor 45C and shielding layer 83 is greater than distance L4 between second inductor 45D and shielding layer 83. Here, the plurality of radio frequency components include first reception filter 3C, second reception filter 3D, and the plurality of inductors 46 (two inductors 46 in the example as illustrated).

First inductor 45A overlaps first low noise amplifier 2A in the thickness direction of mounting board 5. Here, the expression "first inductor 45A overlaps first low noise amplifier 2A in the thickness direction of mounting board 5" means that at least a portion of first inductor 45A overlaps at least a portion of first low noise amplifier 2A in the in the thickness direction of mounting board 5. The case where "first inductor 45A overlaps first low noise amplifier 2A in the thickness direction of mounting board 5" includes, for example, the case where a portion or the whole of first inductor 45A overlaps a portion of first low noise amplifier 2A and the case where a portion or the whole of first inductor 45A overlaps the whole of first low noise amplifier 2A.

As illustrated in FIG. 1, first inductor 45A and second inductor 45B are disposed closer to an edge of mounting board 5 than the radio frequency components are, in a plan view of mounting board 5 in the thickness direction of mounting board 5. Here, the radio frequency components are first reception filter 3A, second reception filter 3B, and inductors 46A and 46B. According to the above-described configuration, it is possible to increase the distance between first inductor 45A and second inductor 45B. As a result, it is possible to weaken the coupling between first inductor 45A and second inductor 45B.

In addition, as described above, first reception filter 3A and second reception filter 3B are disposed between first inductor 45A and second inductor 45B. According to the above-described configuration, it is possible to reduce the length of the line between first inductor 45A and first reception filter 3A as well as the length of the line between second inductor 45B and second reception filter 3B. As a result, when first reception path T21 (see FIG. 3) and second reception path T22 (see FIG. 3) are simultaneously used, it is possible to facilitate ensuring of the isolation between the communications of first reception path T21 and the communications of second reception path T22.

As illustrated in FIG. 1, the plurality of inductors 46 are disposed between the plurality of reception filters 3. More specifically, inductor 46A and inductor 46B are disposed between first reception filter 3A and second reception filter 3B. According to the above-described configuration, it is possible to reduce the lengths of lines between the plurality of inductors 46 and the plurality of reception filters 3. As a result, when first reception path T21 (see FIG. 3) and second reception path T22 (see FIG. 3) are simultaneously used, it is possible to facilitate ensuring of the isolation between the communications of first reception path T21 and the communications of second reception path T22.

In addition, as illustrated in FIG. 2, another element different from first low noise amplifier 2A and second low noise amplifier 2B is included in a single chip with first low noise amplifier 2A and second low noise amplifier 2B. Here, the another electronic element is switch 7, which is disposed between first low noise amplifier 2A and second low noise amplifier 2B in the chip. As a result, when first reception path T21 (see FIG. 3) and second reception path T22 (see FIG. 3) are simultaneously used, it is possible to facilitate ensuring of the isolation between the communications of first reception path T21 and the communications of second reception path T22.

5. Detailed Configuration of Structural Components of Radio Frequency Module 5.1. Mounting Board Mounting board 5 illustrated in FIG. 1 and FIG. 2 is, for example, a printed wiring board, a low temperature co-fired ceramics (LTCC) board, or the like. Here, mounting board 5 is, for example, a multi-layer board including a plurality of dielectric layers (not illustrated) and a plurality of conductor pattern members that include ground layer 54. The plurality of dielectric layers and the plurality of conductor pattern members are stacked in the thickness direction of mounting board 5. The plurality of conductor pattern members are each formed into a predetermined pattern. Each of the plurality of conductor pattern members includes one or more conductor portions in one plane perpendicular to the thickness direction of mounting board 5. The material of each of the plurality of conductor pattern members is copper, for example.

First principal surface 51 and second principal surface 52 of mounting board 5 are located separately in the thickness direction of mounting board 5, and cross the thickness direction of mounting board 5. First principal surface 51 of mounting board 5 is, for example, perpendicular to the thickness direction of mounting board 5. However, first principal surface 51 may include, for example, a side surface of the conductor portion, etc. as a surface that is not perpendicular to the thickness direction. In addition, second principal surface 52 of mounting board 5 is, for example, perpendicular to the thickness direction of mounting board 5. However, second principal surface 52 may include, for example, a side surface of the conductor portion, etc. as a surface that is not perpendicular to the thickness direction. In addition, first principal surface 51 and second principal surface 52 of mounting board 5 may include minute recesses and protrusions, or a recess portion or a protrusion portion.

5.2. Reception Filter

Reception filter 3 is a single-chip filter. Here, the plurality of serial arm resonators and the plurality of parallel arm resonators included in reception filter 3 are each an acoustic wave resonator. In this case, reception filter 3 includes, for example, a board, a piezoelectric body layer, and a plurality of interdigital transducer (IDT) electrodes. The board includes a first surface and a second surface. The piezoelectric body layer is disposed on the first surface of the board. The piezoelectric body layer is disposed on a low acoustic velocity film. The plurality of IDT electrodes are disposed on the piezoelectric body layer. Here, the low acoustic velocity film is disposed directly or indirectly on the board. In addition, the piezoelectric body layer is disposed directly or indirectly on the low acoustic velocity film. The acoustic velocity of a bulk wave that propagates in the low acoustic velocity film is lower than the acoustic velocity of a bulk wave that propagates in the piezoelectric body layer. The acoustic velocity of a bulk wave that propagates in the board is higher than the acoustic velocity of an acoustic wave that propagates in the piezoelectric body layer. The material of the piezoelectric body layer is, for example, lithium tantalate. The material of the low acoustic velocity film is, for example, silicon oxide. The board is a silicon board, for example. The thickness of the piezoelectric body layer is, for example, less than or equal to $3.5\lambda$ where $\lambda$ is a wavelength of an acoustic wave which is determined by an electrode finger cycle of the IDT electrode. The thickness of the low acoustic velocity film is less than or equal to $2.0\lambda$, for example.

It is sufficient if the piezoelectric body layer includes, for example, any of lithium tantalate, lithium niobate, zinc oxide, aluminum nitride, or lead zirconate titanate. In addition, it is sufficient if the low acoustic velocity film includes at least one material selected from a group including silicon oxide, glass, silicon oxynitride, tantalum oxide, and a chemical compound resulting from adding fluorine, carbon, or boron to silicon oxide. In addition, it is sufficient if the board includes at least one material selected from a group including silicon, aluminum nitride, aluminum oxide, silicon carbide, silicon nitride, sapphire, lithium tantalate, lithium niobate, crystal, alumina, zirconia, cordierite, mullite, steatite, forsterite, magnesia, and diamond.

Reception filter 3 further includes, for example, a spacer layer and a cover component. The spacer layer and the cover component are disposed on the first surface of the board. The spacer layer encloses the plurality of IDT electrodes in a plan view of the board in the thickness direction. The spacer layer has a frame shape (quadrilateral frame shape) in a plan view of the board in the thickness direction. The spacer layer has electrical insulation properties. The material of the spacer layer is, for example, synthetic resin such as epoxy resin, polyimide, etc. The cover component has a flat plate shape. The cover component has a rectangular shape in a plan view of the board in the thickness direction. However, the present disclosure is not limited to this example, and the cover component may have a square shape, for example, in a plan view of the board in the thickness direction. In reception filter 3, the external size of the cover component and the external size of the spacer layer are substantially equal to each other in a plan view of the board in the thickness direction. The cover component is disposed on the spacer layer to face the board in the thickness direction of the board. The cover component overlaps the plurality of IDT electrodes in the thickness direction of the board, and the cover component is located separately from the plurality of IDT electrodes in the thickness direction of the board. The cover component has electrical insulation properties. The material of the cover component is, for example, synthetic resin such as epoxy resin, polyimide, etc. Reception filter 3 includes a space enclosed by the board, the spacer layer, and the cover component. In reception filter 3, gas is included in the space. The gas is, for example, air, inert gas (e.g., nitrogen gas), etc. The plurality of terminals are exposed from the cover component. Each of the plurality of terminals is a bump, for example. Each of the bumps is a solder bump, for example. Each of the bumps is not limited to the solder bump, but may be a gold bump, for example.

Reception filter 3 may include an adhesion layer that intervenes between the low acoustic velocity film and the piezoelectric body layer. The adhesion layer includes resin (epoxy resin, polyimide resin), for example. In addition, reception filter 3 may include a dielectric film between the low acoustic velocity film and the piezoelectric body layer, above the piezoelectric body layer, or below the low acoustic velocity film.

In addition, reception filter 3 may include, for example, a high acoustic velocity film that intervenes between the board and the low acoustic velocity film. Here, the high acoustic velocity film is disposed directly or indirectly on the board. The low acoustic velocity film is disposed directly or indirectly on the high acoustic velocity film. The piezoelectric body layer is disposed directly or indirectly on the low acoustic velocity film. The acoustic velocity of a bulk wave that propagates in the high acoustic velocity film is higher than the acoustic velocity of an acoustic wave that propagates in the piezoelectric body layer. The acoustic velocity of a bulk wave that propagates in the low acoustic velocity film is lower than the acoustic velocity of a bulk wave that propagates in the piezoelectric body layer.

The high acoustic velocity film includes: diamond-like carbon; aluminum nitride; aluminum oxide; silicon carbide; silicon nitride; silicon; sapphire; lithium tantalate; lithium niobate; a piezoelectric body such as crystal; alumina; zirconia; cordierite; mullite; steatite; various ceramics such as forsterite; magnesia; diamond; or a material including the above-described materials as main components or a material including a mixture of the above-described materials as main components.

In regard to the thickness of the high acoustic velocity film, since the high acoustic velocity film has a function of confining an acoustic wave into the piezoelectric body layer and the low acoustic velocity film, it is more desirable that the high acoustic velocity film has a larger thickness. Reception filter 3 may include an adhesion layer, a dielectric film, etc., as films other than the high acoustic velocity film, the low acoustic velocity film, and the piezoelectric body layer.

The plurality of serial arm resonators and the plurality of parallel arm resonators are each not limited to the above-described acoustic wave resonator, but may be, for example, SAW resonator or a bulk acoustic wave (BAW) resonator. Here, the SAW resonator includes, for example, a piezoelectric body board and an IDT electrode disposed on the piezoelectric body board When the plurality of serial arm resonators and the plurality of parallel arm resonators are each SAW resonator, reception filter 3 includes, on a single piezoelectric body board, a plurality of IDT electrodes corresponding one-to-one to the plurality of serial arm resonators and a plurality of IDT electrodes corresponding one-to-one to the plurality of parallel arm resonators. The piezoelectric body board is, for example, a lithium tantalate board, a lithium niobate board, or the like.

5.3. Low Noise Amplifier and Switch

The plurality of low noise amplifiers 2 and switch 7 illustrated in FIG. 2 are, for example, a single IC chip that includes a board and an amplifier function unit. The board includes a first surface and a second surface on opposite sides of the board. The board is a silicon board, for example. The amplifier function unit is disposed on the first surface of the board. The amplifier function unit is a function unit having a function of amplifying a reception signal of a predetermined frequency band. The plurality of low noise amplifiers 2 and switch 7, for example, are flip-chip mounted on second principal surface 52 of mounting board 5 such that the first surface of the board is located on the mounting board 5 side. The outer periphery shape of the single IC chip including low noise amplifier 2 and switch 7 is, for example, a quadrilateral shape in a plan view of mounting board 5 in the thickness direction.

6. Communication Device

As illustrated in FIG. 3, communication device 9 according to Embodiment 1 Includes radio frequency module 1, antenna 91, and signal processing circuit 92.

6.1. Antenna

As illustrated in FIG. 3, antenna 91 is connected to antenna terminal 61 of radio frequency module 1. Antenna 91 has a transmission function of emitting a transmission signal via radio waves, and a reception function of receiving, and outputting to radio frequency module 1, a reception signal as radio waves. Examples of the reception signal include the first reception signal and the second reception signal.

6.2. Signal Processing Circuit

Signal processing circuit 92 illustrated in FIG. 3 processes a transmission signal to be transmitted to radio frequency module 1 and a reception signal received from radio frequency module 1. Signal processing circuit 92 includes RF signal processing circuit 93 and baseband signal processing circuit 94. Signal processing circuit 92 processes a first communication signal (a first transmission signal and a first reception signal) and a second communication signal (a second transmission signal and a second reception signal).

6.2.1. RF Signal Processing Circuit

RF signal processing circuit 93 illustrated in FIG. 3 is, for example, a radio frequency integrated circuit (RFIC) that performs signal processing on a radio frequency signal. RF signal processing circuit 93 performs signal processing, by up-conversion or the like, on a radio frequency signal (transmission signal) that has been output from baseband signal processing circuit 94, and outputs, to radio frequency module 1, the radio frequency signal on which the signal processing has been performed. RF signal processing circuit 93 performs signal processing, by down-conversion or the like, on a radio frequency signal (reception signal) that has been output from radio frequency module 1, and outputs, to baseband signal processing circuit 94, the radio frequency signal on which the signal processing has been performed.

6.2.2. Baseband Signal Processing Circuit

Baseband signal processing circuit 94 illustrated in FIG. 3 is, for example, a baseband integrated circuit (BBIC), and performs predetermined signal processing on a transmission signal transmitted from outside of signal processing circuit 92. The reception signal processed by baseband signal processing circuit 94 is, for example, used as an image signal for image display or as a sound signal for telephone conversation.

7. Advantageous Effects

In radio frequency module 1 according to Embodiment 1, in the direction in which first inductor 45A and the radio frequency components (the plurality of reception filters 3 and the plurality of inductors 46) are aligned, distance L1 between first inductor 45A and shielding layer 83 is greater than distance L2 between second inductor 45B and shielding layer 83. First inductor 45A disposed on first reception path T21 through which the first reception signal of the first frequency higher than the second frequency passes is further spaced from shielding layer 83 than second inductor 45B disposed on second reception path T22 through which the second reception signal of the second frequency passes is spaced from shielding layer 83. With this configuration, it is possible to reduce deterioration of Q-value of first inductor 45A.

In addition, in radio frequency module 1 according to Embodiment 1, first inductor 45A overlaps first low noise amplifier 2A. With this configuration, it is possible to reduce the length of a line between first inductor 45A and first low noise amplifier 2A. As a result, it is possible to reduce the parasitic capacitance of line 531.

As described above, with radio frequency module 1 according to Embodiment 1, it is possible to reduce deterioration of noise figure (NF).

In radio frequency module 1 according to Embodiment 1, first inductor 45A and second inductor 45B are disposed closer to an edge of mounting board 5 than radio frequency components (the plurality of reception filters 3 and the plurality of inductors 46) are. According to the above-described configuration, it is possible to increase the distance between first inductor 45A and second inductor 45B. As a result, it is possible to weaken the coupling between first inductor 45A and second inductor 45B.

In radio frequency module 1 according to Embodiment 1, first reception filter 3A and second reception filter 3B are disposed between first inductor 45A and second inductor 45B. According to the above-described configuration, it is possible to reduce the length of the line between first inductor 45A and first reception filter 3A as well as the length of the line between second inductor 45B and second reception filter 3B. As a result, when first reception path T21 and second reception path T22 are simultaneously used, it is possible to facilitate ensuring of the isolation between the communications of first reception path T21 and the communications of second reception path T22.

In radio frequency module 1 according to Embodiment 1, the plurality of inductors 46 disposed on the plurality of reception paths T2 between the plurality of reception filters 3 and switch 7 are each disposed between the plurality of reception filters 3. According to this configuration, it is possible to reduce the lengths of lines between the plurality of inductors 46 and the plurality of reception filters 3. As a result, when first reception path T21 and second reception path T22 are simultaneously used, it is possible to facilitate ensuring of the isolation between the communications of first reception path T21 and the communications of second reception path T22.

In radio frequency module 1 according to Embodiment 1, switch 7 (electronic element) is disposed between first low noise amplifier 2A and second low noise amplifier 2B in a chip. As a result, when first reception path T21 and second reception path T22 are simultaneously used, it is possible to facilitate ensuring of the isolation between the communications of first reception path T21 and the communications of second reception path T22.

Embodiment 2

Figure 4:
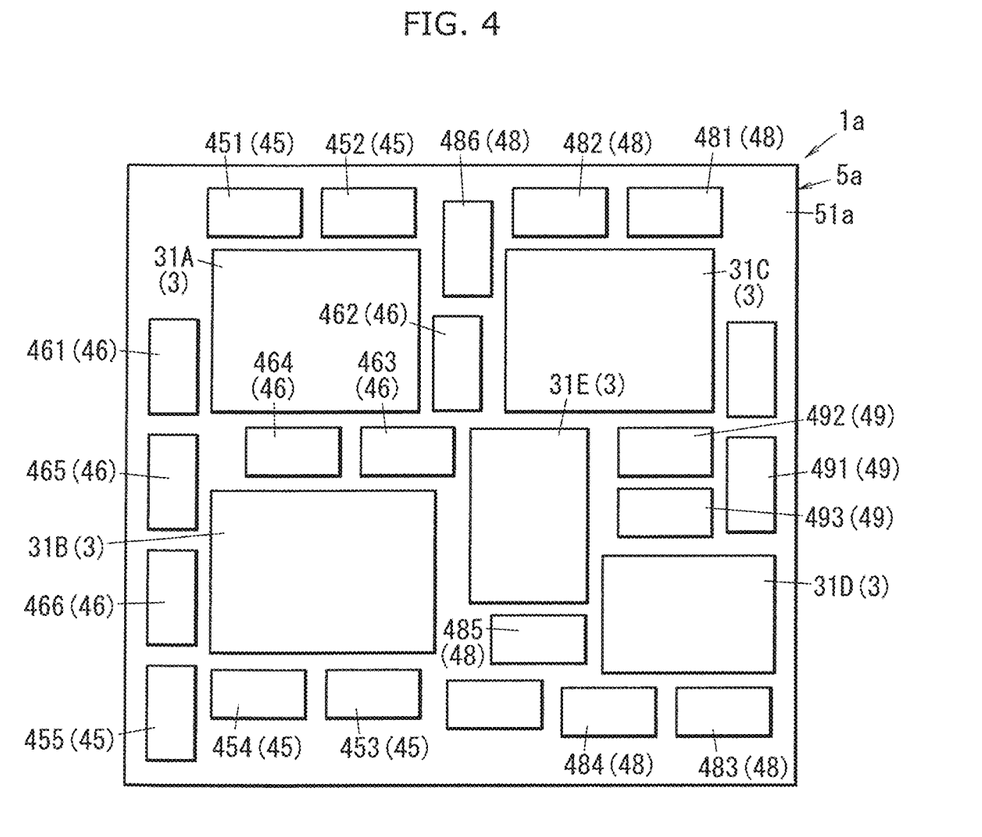
FIG. 4 illustrates a plan view of a radio frequency module according to Embodiment 2.

As illustrated in FIG. 4, the arrangement state of radio frequency module 1a according to Embodiment 2 is different from the arrangement state of radio frequency module 1 (see FIG. 1) according to Embodiment 1. It should be noted that, in regard to radio frequency module 1a according to Embodiment 2, the same structural components as the structural components of radio frequency module 1 according to Embodiment 1 are denoted by the same reference signs, and redundant description may be omitted.

1. Configuration

As illustrated in FIG. 4, radio frequency module 1a according to Embodiment 2 includes a plurality of reception filters 3 (five reception filters in the example as illustrated), a plurality of inductors 45, a plurality of inductors 48, a plurality of inductors 46, and a plurality of inductors 49. In addition, radio frequency module 1a includes mounting board 5a.

The plurality of inductors 45 and the plurality of inductors 48 are disposed on the input side of low noise amplifiers 2 (see FIG. 3) on reception paths T2 (see FIG. 3) through which a reception signal passes. The plurality of inductors 46 and the plurality of inductors 49 are disposed between switch 7 (see FIG. 3) and reception filters 3 on reception paths T2. The plurality of reception filters 3, the plurality of inductors 45, the plurality of inductors 48, the plurality of inductors 46, and the plurality of inductors 49 are disposed on first principal surface 51a of mounting board 5a.

Radio frequency module 1a according to Embodiment 2 is capable of receiving signals corresponding to, for example, 10 communication bands. The plurality of reception filters 3 include reception filter 31A, reception filter 31B, reception filter 31C, reception filter 31D, and reception filter 31E. Reception filter 31A passes a reception signal of the first communication band and a reception signal of the second communication band. Reception filter 31B passes a reception signal of the third communication band and a reception signal of the fourth communication band. Reception filter 31C passes a reception signal of the fifth communication band and a reception signal of the sixth communication band. Reception filter 31D passes a reception signal of the seventh communication band and a reception signal of the eighth communication band. Reception filter 31E passes a reception signal of the ninth communication band and a reception signal of the tenth communication band.

The plurality of inductors 45 include inductor 451 for the first communication band, inductor 452 for the second communication band, inductor 453 for the third communication band, and inductors 454 and 455 for the fourth communication band.

The plurality of inductors 48 include inductor 481 for the fifth communication band, inductor 482 for the sixth communication band, inductor 483 for the seventh communication band, inductor 484 for the eighth communication band, inductor 485 for the ninth communication band, and inductor 486 for the tenth communication band.

The plurality of inductors 46 include inductor 461 for the first communication band, inductor 462 for the second communication band, inductor 463 for the third communication band, and inductors 464, 465, and 466 for the fourth communication band.

The plurality of inductors 49 include inductor 491 for the fifth communication band and the seventh communication band, inductor 492 for the sixth communication band and the eighth communication band, and inductor 493 for the ninth communication band and the tenth communication band.

2. Arrangement Relations

Next, arrangement relations of the plurality of components of radio frequency module 1a according to Embodiment 2 will be described with reference to FIG. 4.

As illustrated in FIG. 4, reception filter 31A and reception filter 31B are disposed between inductors 451 and 452 and inductors 453 and 454 on first principal surface 51a of mounting board 5a. The expression "reception filter 31A and reception filter 31B are disposed between inductors 451 and 452 and inductors 453 and 454" means that reception filter 31A and reception filter 31B are disposed in a minimum region including a plurality of straight lines connecting given points of inductors 451 and 452 and given points of inductors 453 and 454. In this case, it is sufficient if at least a portion of reception filter 31A and at least a portion of reception filter 31B are included in the above-described region.

In addition, inductors 463 and 464 are disposed between reception filter 31A and reception filter 31B. The expression "inductors 463 and 464 are disposed between reception filter 31A and reception filter 31B" means that inductors 463 and 464 are disposed in a minimum region including a plurality of straight lines connecting given points of reception filter 31A and given points of reception filter 31B. In this case, it is sufficient if at least a portion of inductor 463 and at least a portion of inductor 464 are included in the above-described region.

In the same manner as above, reception filter 31C, reception filter 31D, and reception filter 31E are disposed between (i) inductors 481 and 482 and (ii) inductors 483 and 484 on first principal surface 51a of mounting board 5a. In addition, inductors 491, 492, and 493 are disposed between reception filter 31C and reception filter 31D. The expression "reception filter 31C, reception filter 31D, and reception filter 31E are disposed between inductors 481 and 482 and inductors 483 and 484" means that reception filter 31C, reception filter 31D, and reception filter 31E are disposed in a minimum region including a plurality of straight lines connecting given points of inductors 481 and 482 and given points of inductors 483 and 484. In this case, it is sufficient if at least a portion of reception filter 31C, at least a portion of reception filter 31D, and at least a portion of reception filter 31E are included in the above-described region.

3. Advantageous Effects

In radio frequency module 1a according to Embodiment 2, reception filter 31A and reception filter 31B are disposed between (i) inductors 451 and 452 and (ii) inductors 453 and 454. According to this configuration, it is possible to reduce the lengths of lines between (i) inductors 451 and 452 and (iii) reception filter 31A as well as the lengths of lines between (ii) inductors 453 and 454 and (iv) reception filter 31B. As a result, when a plurality of reception paths T2 (see FIG. 3) are simultaneously used, it is possible to facilitate ensuring of the isolation between the communications of the plurality of reception paths T2.

In the same manner as above, a plurality of reception filters, namely, reception filters 31C, 31D, and 31E are disposed between (i) inductors 481 and 482 and (ii) inductors 483 and 484. According to this configuration, it is possible to reduce the lengths of lines between (i) inductors 481 and 482 and (iii) reception filter 31C as well as the lengths of lines between (ii) inductors 483 and 484 and (iv) reception filter 31D. As a result, when the plurality of reception paths T2 are simultaneously used, it is possible to facilitate ensuring of the isolation between the communications of the plurality of reception paths T2.

In radio frequency module 1a according to Embodiment 2, inductors 463 and 464 are disposed between reception filter 31A and reception filter 31B. According to this configuration, it is possible to reduce the lengths of lines between (i) inductors 463 and 464 and (ii) reception filter 31B. As a result, when the plurality of reception paths T2 are simultaneously used, it is possible to facilitate ensuring of the isolation between the communications of the plurality of reception paths T2.

In the same manner as above, inductors 491, 492, and 493 are disposed between reception filter 31C and reception filter 31D. According to this configuration, it is possible to reduce the lengths of lines between (i) inductors 491 and 492 and (ii) reception filter 31C as well as the lengths of lines between (i) inductors 491 and 492 and (iii) reception filter 31D, and the length of a line between inductor 493 and reception filter 31E. As a result, when the plurality of reception paths T2 are simultaneously used, it is possible to facilitate ensuring of the isolation between the communications of the plurality of reception paths T2.

Embodiment 3

Figure 5:
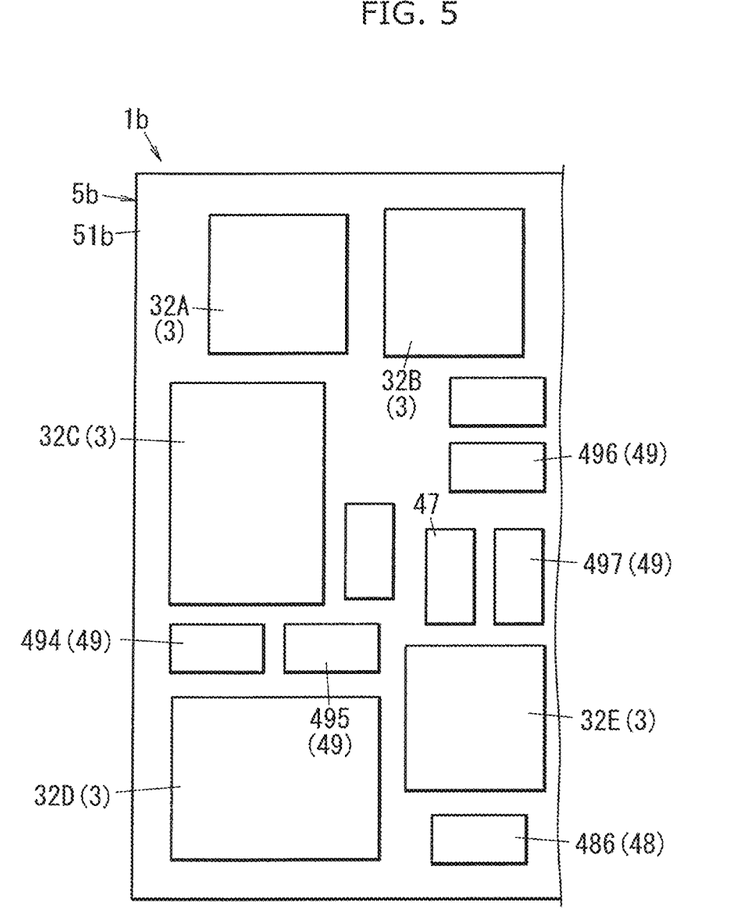
FIG. 5 illustrates a plan view of principal sections of a radio frequency module according to Embodiment 3.

As illustrated in FIG. 5, the arrangement state of radio frequency module 1b according to Embodiment 3 is different from the arrangement state of radio frequency module 1 (see FIG. 1) according to Embodiment 1. It should be noted that, in regard to radio frequency module 1b according to Embodiment 3, the same structural components as the structural components of radio frequency module 1 according to Embodiment 1 are denoted by the same reference signs, and redundant description may be omitted.

1. Configuration

As illustrated in FIG. 5, radio frequency module 1b according to Embodiment 3 includes a plurality of reception filters 3 (five reception filters in the example as illustrated), inductor 47, inductor 48, and a plurality of inductors 49. In addition, radio frequency module 1b includes mounting board 5b.

Inductor 48 is disposed on the input side of low noise amplifiers 2 (see FIG. 3) on reception path T2 (see FIG. 3) through which a reception signal passes. The plurality of inductors 49 are each disposed between switch 7 (see FIG. 3) and reception filter 3 on reception path T2.

Radio frequency module 1b according to Embodiment 3 is capable of receiving signals corresponding to, for example, 7 communication bands. The plurality of reception filters 3 include reception filter 32A, reception filter 32B, reception filter 32C, reception filter 32D, and reception filter 32E. Reception filter 32A passes a reception signal of the first communication band. Reception filter 32B passes a reception signal of the second communication band.

Reception filter 32C passes a reception signal of the third communication band and a reception signal of the fourth communication band. Reception filter 32D passes a reception signal of the fifth communication band and a reception signal of the sixth communication band. Reception filter 32E passes a reception signal of the seventh communication band.

The plurality of inductors 49 include inductor 494 for the fifth communication band, inductor 495 for the sixth communication band, inductor 496 for the first communication band and the third communication band, and inductor 497 for the seventh communication band.

2. Arrangement Relations

Next, arrangement relations of the plurality of components of radio frequency module 1b according to Embodiment 3 will be described with reference to FIG. 5.

As illustrated in FIG. 5, inductors 494 and 495 are disposed between reception filter 32C and reception filter 32D. In addition, inductors 496 and 497 are disposed between (i) reception filters 32A and 32B and (ii) reception filter 32E. The expression "inductors 494 and 495 are disposed between reception filter 32C and reception filter 32D" means that inductors 494 and 495 are disposed in a minimum region including a plurality of straight lines connecting given points of reception filter 32C and given points of reception filter 32D. In this case, it is sufficient if at least a portion of inductor 494 and at least a portion of inductor 495 are included in the above-described region.

3. Advantageous Effects

In radio frequency module 1b according to Embodiment 3, inductors 494 and 495 are disposed between reception filter 32C and reception filter 32D. According to this configuration, it is possible to reduce the lengths of lines between (i) inductors 494 and 495 and (ii) reception filter 32D. As a result, when the plurality of reception paths T2 are simultaneously used, it is possible to facilitate ensuring of the isolation between the communications of the plurality of reception paths T2.

In the same manner as above, inductors 496 and 497 are disposed between reception filter 32A and reception filter 32E. According to this configuration, it is possible to reduce the length of a line between inductor 496 and reception filter 32A as well as the length of a line between inductor 497 and reception filter 32E. As a result, when the plurality of reception paths T2 are simultaneously used, it is possible to facilitate ensuring of the isolation between the communications of the plurality of reception paths T2.

Embodiment 4

Figure 6:
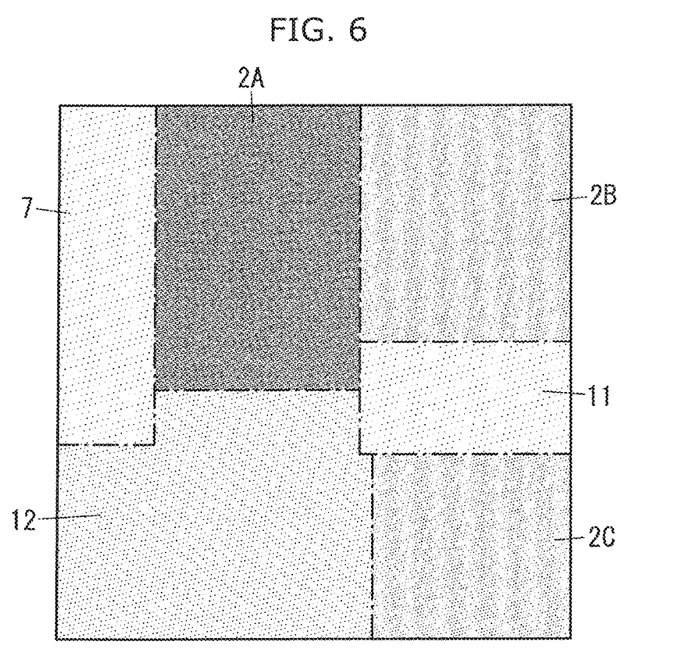
FIG. 6 illustrates a plan view of principal sections of a radio frequency module according to Embodiment 4.

As illustrated in FIG. 6, Embodiment 4 describes arrangement relations in a chip that includes a plurality of low noise amplifiers 2A, 2B, and 2C. It should be noted that, in regard to radio frequency module 1 according to Embodiment 4, the same structural components as the structural components of radio frequency module 1 according to Embodiment 1 are denoted by the same reference signs, and redundant description may be omitted.

1. Configuration

The chip according to Embodiment 4 includes a plurality of low noise amplifiers 2A, 2B, and 2C, switch 7, switch 11, and controller 12 as illustrated in FIG. 6. Switch 11 is a switch disposed on the output side of any one of the plurality of low noise amplifiers 2A, 2B, and 2C. Controller 12 controls low noise amplifiers 2A, 2B, and 2C, and switches 7 and 11.

2. Arrangement Relations

Next, the arrangement relations in the chip of radio frequency module 1 according to Embodiment 4 will be described with reference to FIG. 6.

As illustrated in FIG. 6, switch 11 (radio frequency component) is disposed between low noise amplifier 2A and low noise amplifier 2C in the chip. In the same manner as above, switch 11 is disposed between low noise amplifier 2B and low noise amplifier 2C. The expression "switch 11 is disposed between low noise amplifier 2A and low noise amplifier 2C" means that switch 11 is disposed in a minimum region including a plurality of straight lines connecting given points of low noise amplifier 2A and given points of low noise amplifier 2C. In this case, it is sufficient if at least a portion of switch 11 is included in the above-described region. In the same manner as above, the expression "switch 11 is disposed between low noise amplifier 2B and low noise amplifier 2C" means that switch 11 is disposed in a minimum region enclosed by a plurality of straight lines connecting given points of low noise amplifier 2B and given points of low noise amplifier 2C. In this case, it is sufficient if at least a portion of switch 11 is included in the above-described region. With the above-described configuration, it is possible to space low noise amplifiers 2A and 2B from low noise amplifier 2C.

3. Advantageous Effects

In radio frequency module 1 according to Embodiment 4, switch 11 is disposed between (i) low noise amplifiers 2A and 2B and (ii) low noise amplifier 2C. With the above-described configuration, it is possible to space low noise amplifiers 2A and 2B from low noise amplifier 2C. As a result, when the plurality of reception paths T2 are simultaneously used, it is possible to facilitate ensuring of the isolation between the communications of the plurality of reception paths T2.

4. Variations

Figure 7:
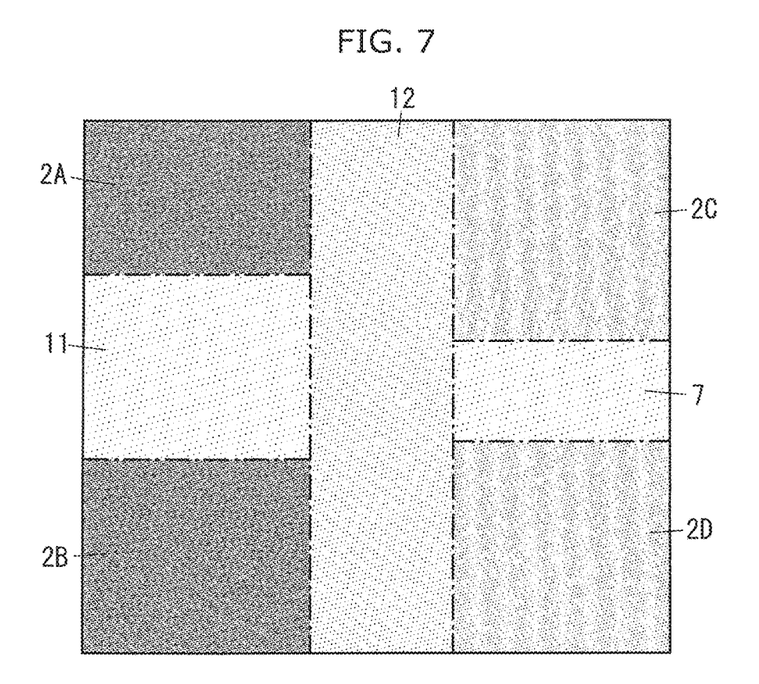
FIG. 7 illustrates a plan view of principal sections of a radio frequency module according to a variation of Embodiment 4.

As a variation of Embodiment 4, a chip illustrated in FIG. 7 may be employed.

As illustrated in FIG. 7, switch 11 (radio frequency component) is disposed between low noise amplifier 2A and low noise amplifier 2B in the chip. With the above-described configuration, it is possible to space low noise amplifier 2A from low noise amplifier 2B. In the same manner as above, switch 7 is disposed between low noise amplifier 2C and low noise amplifier 2D. With the above-described configuration, it is possible to space low noise amplifier 2C from low noise amplifier 2D. In addition, controller 12 is disposed between (i) low noise amplifiers 2A and 2B and (ii) low noise amplifiers 2C and 2D. With the above-described configuration, it is possible to space low noise amplifiers 2A and 2B from low noise amplifiers 2C and 2D.

Radio frequency module 1 according to the above-described variation also yields advantageous effects equivalent to the advantageous effects yielded by radio frequency module 1 according to Embodiment 4.

The above-described embodiments and variations are merely part of the various embodiments and variations of the present disclosure. In addition, various modifications can be applied, according to the designs, etc., to the embodiments and the variations, as long as the object of the present disclosure can be achieved.

Aspects

The present specification discloses the following aspects.

A radio frequency module (1) according to the first aspect includes: a mounting board (5); an external-connection terminal (6); a first low noise amplifier (2A); a second low noise amplifier (2B); a first inductor (45A); a second inductor (45B); at least one radio frequency component (reception filter 3, inductor 46); a switch (7); and a shielding layer (83). The mounting board (5) includes a first principal surface (51) and a second principal surface (52) on opposite sides of the mounting board (5). The external-connection terminal (6) is disposed on the second principal surface (52) of the mounting board (5). The first low noise amplifier (2A) is disposed on the second principal surface (52) of the mounting board (5), and located on a first reception path (T21) through which a first reception signal of a first frequency passes. The second low noise amplifier (2B) is disposed on the second principal surface (52) of the mounting board (5), and located on a second reception path (T22) through which a second reception signal of a second frequency passes. The first inductor (45A) is disposed on the first principal surface (51) of the mounting board (5) and located on the first reception path (T21) on an input side of the first low noise amplifier (2A). The second inductor (45B) is disposed on the first principal surface (51) of the mounting board (5) and located on the second reception path (T22) on an input side of the second low noise amplifier (2B). The above-described at least one radio frequency component is disposed on the first principal surface (51) of the mounting board (5) between the first inductor (45A) and the second inductor (45B). The switch (7) is capable of simultaneously connecting, to an antenna terminal (61), the first reception path (T21) and the second reception path (T22). The shielding layer (83) covers the first low noise amplifier (2A), the second low noise amplifier (2B), the first inductor (45A), the second inductor (45B), and the above-described at least one radio frequency component. A distance (L1) between the first inductor (45A) and the shielding layer (83) is greater than a distance (L2) between the second inductor (45B) and the shielding layer (83) in a direction in which the first inductor (45A), the above-described at least one radio frequency component, and the second inductor (45B) are aligned. The first inductor (45A) overlaps the first low noise amplifier (2A) in the thickness direction of the mounting board (5).

In the radio frequency module (1) according to the first aspect, the first inductor (45A) disposed on the first reception path (T21) through which the first reception signal of the first frequency higher than the second frequency passes is further spaced from the shielding layer (83) than the second inductor (45B) disposed on the second reception path (T22) through which the second reception signal of the second frequency passes is spaced from the shielding layer (83). With the above-described configuration, it is possible to reduce deterioration of Q-value of the first inductor (45A).

In addition, in the radio frequency module (1) according to the first aspect, the first inductor (45A) overlaps the first low noise amplifier (2A). With the above-described configuration, it is possible to reduce the length of a line between the first inductor (45A) and the first low noise amplifier (2A). As a result, it is possible to reduce the parasitic capacitance of the line (531).

According to the above-described configuration, with the radio frequency module (1) according to the first aspect, it is possible to reduce deterioration of the NF.

A radio frequency module (1) according to the second aspect includes: a mounting board (5); an external-connection terminal (6); a first low noise amplifier (2A); a second low noise amplifier (2B); a first inductor (45A); a second inductor (45B); at least one radio frequency component (reception filter 3, inductor 46); and a shielding layer (83). The mounting board (5) includes a first principal surface (51) and a second principal surface (52) on opposite sides of the mounting board (5). The external-connection terminal (6) is disposed on the second principal surface (52) of the mounting board (5). The first low noise amplifier (2A) is disposed on the second principal surface (52) of the mounting board (5), and located on a first reception path (T21) through which a first reception signal of a first frequency passes. The second low noise amplifier (2B) is disposed on the second principal surface (52) of the mounting board (5), and located on a second reception path (T22) through which a second reception signal of a second frequency lower than the first frequency passes. The second reception path (T22) is used simultaneously with the first reception path (T21). The first inductor (45A) is disposed on the first principal surface (51) of the mounting board (5) and located on the first reception path (T21) on an input side of the first low noise amplifier (2A). The second inductor (45B) is disposed on the first principal surface (51) of the mounting board (5) and located on the second reception path (T22) on an input side of the second low noise amplifier (2B). The above-described at least one radio frequency component is disposed on the first principal surface (51) of the mounting board (5) between the first inductor (45A) and the second inductor (45B). The shielding layer (83) covers the first low noise amplifier (2A), the second low noise amplifier (2B), the first inductor (45A), the second inductor (45B), and the above-described at least one radio frequency component. A distance (L1) between the first inductor (45A) and the shielding layer (83) is greater than a distance (L2) between the second inductor (45B) and the shielding layer (83) in a direction in which the first inductor (45A), the above-described at least one radio frequency component, and the second inductor (45B) are aligned. The first inductor (45A) overlaps the first low noise amplifier (2A) in the thickness direction of the mounting board (5).

In the radio frequency module (1) according to the second aspect, the first inductor (45A) disposed on the first reception path (T21) through which the first reception signal of the first frequency higher than the second frequency passes is further spaced from the shielding layer (83) than the second inductor (45B) disposed on the second reception path (T22) through which the second reception signal of the second frequency passes is spaced from the shielding layer (83). According to the above-described configuration, it is possible to reduce deterioration of Q-value of the first inductor (45A).

In addition, in the radio frequency module (1) according to the second aspect, the first inductor (45A) overlaps the first low noise amplifier (2A). According to the above-described configuration, it is possible to reduce the length of a line between the first inductor (45A) and the first low noise amplifier (2A). As a result, it is possible to reduce the parasitic capacitance of the line (531).

According to the above-described configuration, with the radio frequency module (1) according to the second aspect, it is possible to reduce deterioration of the NF.

In a third aspect, in the radio frequency module (1) according to the first aspect or the second aspect, the first inductor (45A) and the second inductor (45B) are disposed closer to an edge of the mounting board (5) than the at least one radio frequency component (e.g., reception filter 3, and inductor 46) is, in a plan view of the mounting board (5) in the thickness direction.

With the radio frequency module (1) in the third aspect, it is possible to increase the distance between the first inductor (45A) and the second inductor (45B). As a result, it is possible to weaken the coupling between the first inductor (45A) and the second inductor (45B).

In a fourth aspect, the radio frequency module (1) according to any one of the first to third aspects includes a first reception filter (3A) and a second reception filter (3B) as the at least one radio frequency component (reception filter 3A and inductor 46). The first reception filter (3A) passes the first reception signal. The second reception filter (3B) passes the second reception signal.

With the radio frequency module (1) in the fourth aspect, it is possible to reduce the length of a line between the first inductor (45A) and the first reception filter (3A) as well as the length of a line between the second inductor (45B) and the second reception filter (3B). As a result, when the first reception path (T21) and the second reception path (T22) are simultaneously used, it is possible to facilitate ensuring of the isolation between the communications of first reception path T21 and the communications of second reception path T22.

In a fifth aspect, the radio frequency module (1) according to any one of the first to third aspects includes a plurality of reception filters (3) and inductors (46) as the at least one radio frequency component (reception filter 3 and inductor 46). The inductors (46), on the first reception path (T21) and the second reception path (T22), are each disposed between the plurality of reception filters (3) and the switch (7) capable of simultaneously connecting, to the antenna terminal (61), the first reception path (T21) and the second reception path (T22). The inductors (46) are disposed between the plurality of reception filters (3).

With the radio frequency module (1) in the fifth aspect, it is possible to reduce the lengths of the lines between the inductors (46) and the plurality of reception filters (3). As a result, when the first reception path (T21) and the second reception path (T22) are simultaneously used, it is possible to facilitate ensuring of the isolation between the communications of first reception path T21 and the communications of second reception path T22.

In a sixth aspect, the radio frequency module (1) according to any one of the first to fifth aspects further includes an electronic element (e.g., switches 7, 11, and controller 12) that is different from the first low noise amplifier (2A) and the second low noise amplifier (2B).

The above-described different element, the first low noise amplifier (2A), and the second low noise amplifier (2B) are included in a single chip. The above-described different element is disposed between the first low noise amplifier (2A) and the second low noise amplifier (2B) in the single chip.

With the radio frequency module (1) in the sixth aspect, when the first reception path (T21) and the second reception path (T22) are simultaneously used, it is possible to facilitate ensuring of the isolation between the communications of first reception path T21 and the communications of second reception path T22.

A communication device (9) according to the seventh aspect includes the radio frequency module (1) according to any one of the first to sixth aspects, and a signal processing circuit (92). The signal processing circuit (92) processes a signal from the radio frequency module (1).

With the communication device (9) according to the seventh aspect, the first inductor (45A) disposed on the first reception path (T21) through which the first reception signal of the first frequency higher than the second frequency passes is further spaced from the shielding layer (83) than the second inductor (45B) disposed on the second reception path (T22) through which the second reception signal of the second frequency passes is spaced from the shielding layer (83) in the radio frequency module (1). According to the above-described configuration, it is possible to reduce deterioration of Q-value of the first inductor (45A).

In addition, in the communication device (9) according to the seventh aspect, the first inductor (45A) overlaps the first low noise amplifier (2A) in the radio frequency module (1). According to this configuration, it is possible to reduce the length of a line between the first inductor (45A) and the first low noise amplifier (2A). As a result, it is possible to reduce the parasitic capacitance of the line (531).

According to the above-described configuration, with the communication device (9) according to the seventh aspect, it is possible to reduce deterioration of the NF in the radio frequency module (1).

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The invention claimed is:

1. A radio frequency module, comprising:
   a mounting board including a first principal surface and a second principal surface on opposite sides of the mounting board;
   a first low noise amplifier disposed on the second principal surface of the mounting board and located on a first reception path through which a first reception signal of a first frequency passes;
   a second low noise amplifier disposed on the second principal surface of the mounting board and located on a second reception path through which a second reception signal of a second frequency passes, the second frequency being lower than the first frequency;
   a first inductor disposed on the first principal surface of the mounting board and located on the first reception path on an input side of the first low noise amplifier;
   a second inductor disposed on the first principal surface of the mounting board and located on the second reception path on an input side of the second low noise amplifier;

at least one radio frequency component disposed on the first principal surface of the mounting board between the first inductor and the second inductor;

a shielding layer configured to cover the first low noise amplifier, the second low noise amplifier, the first inductor, the second inductor, and the at least one radio frequency component, wherein a distance between the first inductor and the shielding layer is greater than a distance between the second inductor and the shielding layer in a direction in which the first inductor, the at least one radio frequency component, and the second inductor are aligned, and the first inductor overlaps the first low noise amplifier in a thickness direction of the mounting board.

2. The radio frequency module of claim 1, further comprising:

an external-connection terminal disposed on the second principal surface of the mounting board.

3. The radio frequency module of claim 1, further comprising:

a switch configured to simultaneously connect to an antenna terminal, the first reception path and the second reception path.

4. The radio frequency module of claim 1, wherein the second reception path and the first reception path are configured to be used simultaneously.

5. The radio frequency module of claim 1, wherein in a plan view of the mounting board in the thickness direction, the first inductor and the second inductor are disposed closer to an edge of the mounting board than the at least one radio frequency component.

6. The radio frequency module of claim 1, wherein the at least one radio frequency component comprises:

a first reception filter that passes the first reception signal; and a second reception filter that passes the second reception signal.

7. The radio frequency module of claim 3, wherein the at least one radio frequency component comprises:

a plurality of reception filters; and a third inductor disposed on the first reception path; and a fourth inductor disposed on the second reception path.

8. The radio frequency module of claim 7, wherein the third inductor and the fourth inductor are each located between the switch and the plurality of reception filters.

9. The radio frequency module of claim 7, wherein the third indictor and the fourth inductor are disposed between the plurality of reception filters.

10. The radio frequency module of claim 1, wherein the first low noise amplifier, the second low noise amplifier and another electronic element are included in a single chip.

11. The radio frequency module of claim 10, wherein the another electronic element is disposed between the first low noise amplifier and the second low noise amplifier in the single chip.

12. The radio frequency module of claim 10, wherein the another electronic element is a switch configured to simultaneously connect to an antenna terminal, the first reception path and the second reception path.

13. A radio frequency module, comprising:

a mounting board including a first principal surface and a second principal surface on opposite sides of the mounting board;

a first low noise amplifier disposed on the second principal surface of the mounting board and located on a first reception path through which a first reception signal passes;

a second low noise amplifier disposed on the second principal surface of the mounting board and located on a second reception path through which a second reception signal passes;

a first inductor disposed on the first principal surface of the mounting board and located on the first reception path on an input side of the first low noise amplifier;

a second inductor disposed on the first principal surface of the mounting board and located on the second reception path on an input side of the second low noise amplifier;

at least one radio frequency component disposed on the first principal surface of the mounting board between the first inductor and the second inductor;

a shielding layer configured to cover the first low noise amplifier, the second low noise amplifier, the first inductor, the second inductor, and the at least one radio frequency component, wherein a distance between the first inductor and the shielding layer is greater than a distance between the second inductor and the shielding layer in a direction in which the first inductor, the at least one radio frequency component, and the second inductor are aligned.

14. The radio frequency module of claim 13, wherein in a plan view of the module board, a footprint of the first inductor at least partially overlaps a footprint of the first low noise amplifier.

15. The radio frequency module of claim 13, further comprising:

a switch configured to simultaneously connect to an antenna terminal, the first reception path and the second reception path.

16. The radio frequency module of claim 15, wherein the first low noise amplifier, the second low noise amplifier and the switch are disposed on a single chip.

17. The radio frequency module of claim 13, wherein the second reception path and the first reception path are configured to be used simultaneously.

18. The radio frequency module of claim 13, wherein in a plan view of the mounting board in the thickness direction, the first inductor and the second inductor are disposed closer to an edge of the mounting board than the at least one radio frequency component.

19. The radio frequency module of claim 15, wherein the at least one radio frequency component comprises:

a first reception filter that passes the first reception signal; and a second reception filter that passes the second reception signal;

a third inductor disposed on the first reception path; and a fourth inductor disposed on the second reception path, wherein the third inductor and the fourth inductor are each located between the switch and the first and second reception filters.

20. A communication device, comprising:

a radio frequency module comprising a mounting board including a first principal surface and a second principal surface on opposite sides of the mounting board;

a first low noise amplifier disposed on the second principal surface of the mounting board and located on a first reception path through which a first reception signal of a first frequency passes;

a second low noise amplifier disposed on the second principal surface of the mounting board and located on a second reception path through which a second reception signal of a second frequency passes, the second frequency being lower than the first frequency;

a first inductor disposed on the first principal surface of the mounting board and located on the first reception path on an input side of the first low noise amplifier;

a second inductor disposed on the first principal surface of the mounting board and located on the second reception path on an input side of the second low noise amplifier; at least one radio frequency component disposed on the first principal surface of the mounting board between the first inductor and the second inductor;

a shielding layer configured to cover the first low noise amplifier, the second low noise amplifier, the first inductor, the second inductor, and the at least one radio frequency component, wherein a distance between the first inductor and the shielding layer is greater than a distance between the second inductor and the shielding layer in a direction in which the first inductor, the at least one radio frequency component, and the second inductor are aligned, and the first inductor overlaps the first low noise amplifier in a thickness direction of the mounting board; and a signal processing circuit configured to process a signal from the radio frequency module.

* * * * *